United States Patent
Hoffmann et al.

(10) Patent No.: US 12,180,938 B2
(45) Date of Patent: Dec. 31, 2024

(54) SYSTEM AND METHOD FOR REDUCING WIND TURBINE LOADS CAUSED BY ROTOR IMBALANCE

(71) Applicant: General Electric Renovables Espana, S.L., Barcelona (ES)

(72) Inventors: Till Hoffmann, Osnabrueck (DE); Leonardo Cesar Kammer, Niskayuna, NY (US); Conner Brooks Shane, Glenville, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/187,910

(22) Filed: Mar. 22, 2023

(65) Prior Publication Data

US 2024/0318631 A1  Sep. 26, 2024

(51) Int. Cl.
*F03D 7/04* (2006.01)
*F03D 7/02* (2006.01)

(52) U.S. Cl.
CPC ............ *F03D 7/04* (2013.01); *F03D 7/0204* (2013.01); *F03D 7/0276* (2013.01); *F05B 2270/204* (2020.08); *F05B 2270/32* (2013.01); *F05B 2270/331* (2013.01); *F05B 2270/504* (2013.01)

(58) Field of Classification Search
CPC ........ F03D 7/04; F03D 7/0204; F03D 7/0276; F03D 7/0224; F03D 7/045; F05B 2270/32; F05B 2270/204; F05B 2270/331; F05B 2270/504; F05B 2270/20; F05B 2270/1031; Y02E 10/72
See application file for complete search history.

(56) References Cited

U.S. PATENT DOCUMENTS

| | | | |
|---|---|---|---|
| 2010/0014969 A1* | 1/2010 | Wilson | F03D 7/0296 416/31 |
| 2010/0140940 A1* | 6/2010 | Kammer | F03D 7/0224 290/44 |
| 2011/0211200 A1 | 9/2011 | Cribbs | |
| 2012/0027586 A1* | 2/2012 | Hoffmann | F03D 7/0224 416/31 |
| 2013/0064663 A1 | 3/2013 | Loth et al. | |

(Continued)

FOREIGN PATENT DOCUMENTS

| CN | 106368898 A | 2/2017 |
|---|---|---|
| CN | 112 610 412 A | 4/2021 |

(Continued)

OTHER PUBLICATIONS

EPO Search Report, Aug. 9, 2024.

*Primary Examiner* — Wesley G Harris
(74) *Attorney, Agent, or Firm* — Dority & Manning, P.A.

(57) ABSTRACT

A method for reducing loads acting on a wind turbine includes determining, via a processor, at least one loading condition of the wind turbine resulting from a wind shear condition below a design threshold, determining, via the processor, a rotor speed setpoint of the wind turbine to cause an increase in thrust when the at least one loading condition exceeds a loading threshold; operating the wind turbine based on the rotor speed, and operating a rotor imbalance control module of the wind turbine to at least partially compensate for the at least one loading condition of the wind turbine resulting from the wind shear condition below the design threshold.

17 Claims, 6 Drawing Sheets

(56) References Cited

U.S. PATENT DOCUMENTS

| | | | |
|---|---|---|---|
| 2015/0086362 A1* | 3/2015 | Fu | F03D 7/0224 |
| | | | 416/1 |
| 2016/0033580 A1* | 2/2016 | Qiao | G01R 31/343 |
| | | | 324/765.01 |
| 2016/0115941 A1* | 4/2016 | Marwaha | F03D 7/0224 |
| | | | 416/37 |
| 2016/0138571 A1 | 5/2016 | Perley et al. | |
| 2016/0237988 A1 | 8/2016 | Perley et al. | |
| 2018/0320660 A1* | 11/2018 | Herr | F03D 7/028 |
| 2021/0123413 A1 | 4/2021 | Vaddi et al. | |
| 2023/0175489 A1* | 6/2023 | Danielsen | F03D 7/042 |
| | | | 416/1 |

FOREIGN PATENT DOCUMENTS

| | | | | |
|---|---|---|---|---|
| EP | 2000667 A1 | 12/2008 | | |
| EP | 2025929 A2 * | 2/2009 | | F03D 13/35 |
| EP | 2175131 A2 * | 4/2010 | | F03D 7/0224 |
| EP | 2781738 A1 | 9/2014 | | |
| EP | 2840258 A1 * | 2/2015 | | F01D 17/04 |
| EP | 3276164 A2 * | 1/2018 | | F03D 17/00 |
| EP | 3514373 A1 * | 7/2019 | | F03D 7/02 |
| EP | 3597904 A1 * | 1/2020 | | F03D 17/00 |
| WO | WO2012/136277 A1 | 10/2012 | | |

\* cited by examiner

SYSTEM AND METHOD FOR REDUCING WIND TURBINE LOADS CAUSED BY ROTOR IMBALANCE

FIELD

The present disclosure relates generally to wind turbines, and more particularly, to systems and methods for reducing wind turbine loads caused by rotor imbalance.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, wind condition(s) around a wind turbine change often, thereby causing variations in both extreme and fatigue loads acting on the wind turbine. As such, the wind turbine may include a controller that can implement various control actions, such as pitching one or more of the rotor blades, yawing the nacelle, derating the wind turbine, or shutting down the wind turbine to reduce such loads.

Shear-induced loading has mostly been considered relevant only in the positive direction. In such instances, the rotor overhang loading may be compensated for by aerodynamic loading. Therefore, rotor imbalance control (RIC) systems can have sufficient influence over the wind turbine, even when utilizing low individual pitch offsets, to maintain the nodding moments within defined boundaries. However, with increasing rotor sizes and weights, an uncontrolled or uncompensated negative nodding moment resulting from negative wind shear can have a significant fatigue impact on the wind turbine and can easily cause major component failures.

Accordingly, an improved system and method for reducing wind turbine loads, such as rotor imbalance, during the aforementioned wind conditions would be welcomed in the art.

BRIEF DESCRIPTION

Aspects and advantages of the present disclosure will be set forth in part in the following description, or may be obvious from the description, or may be learned through practice of the present disclosure.

In an aspect, the present disclosure is directed to a method for reducing loads acting on a wind turbine. The method includes determining, via a processor, at least one loading condition of the wind turbine resulting from a wind shear condition below a design threshold; determining, via the processor, a rotor speed setpoint of the wind turbine to cause an increase in thrust when the at least one loading condition exceeds a loading threshold; operating the wind turbine based on the rotor speed; and operating a rotor imbalance control module of the wind turbine to at least partially compensate for the at least one loading condition of the wind turbine resulting from the wind shear condition below the design threshold.

In another aspect, the present disclosure is directed to a system for rotor imbalance control in a wind turbine. The wind turbine has a nacelle mounted atop a tower and a rotor mounted to the nacelle. The rotor has a rotatable hub with a plurality of rotor blades mounted thereto. The system includes a controller having at least one processor configured to perform a plurality of operations. The plurality of operations include determining at least one loading condition of the wind turbine resulting from a wind shear condition below a design threshold; determining whether the rotor of the wind turbine is imbalanced beyond a predetermined threshold as a function of the at least one loading condition; and implementing a control action when the rotor is imbalanced beyond the predetermined threshold.

In yet another aspect, the present disclosure is directed to a method for adaptive rotor imbalance control in a wind turbine. The method includes determining, via a processor, one or more wind conditions at the wind turbine; determining, via the processor, one or more control actions currently implemented for rotor imbalance control of a rotor of the wind turbine; determining, via the processor, whether the rotor is imbalanced beyond a predetermined threshold as a function of a loading condition; determining, via the processor, whether the one or more wind conditions at the nacelle are indicative of negative wind shear conditions at the wind turbine; and generating, via the processor, a correction command for the rotor imbalance control when the rotor is imbalanced beyond the predetermined threshold and when the negative wind shear conditions are determined.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
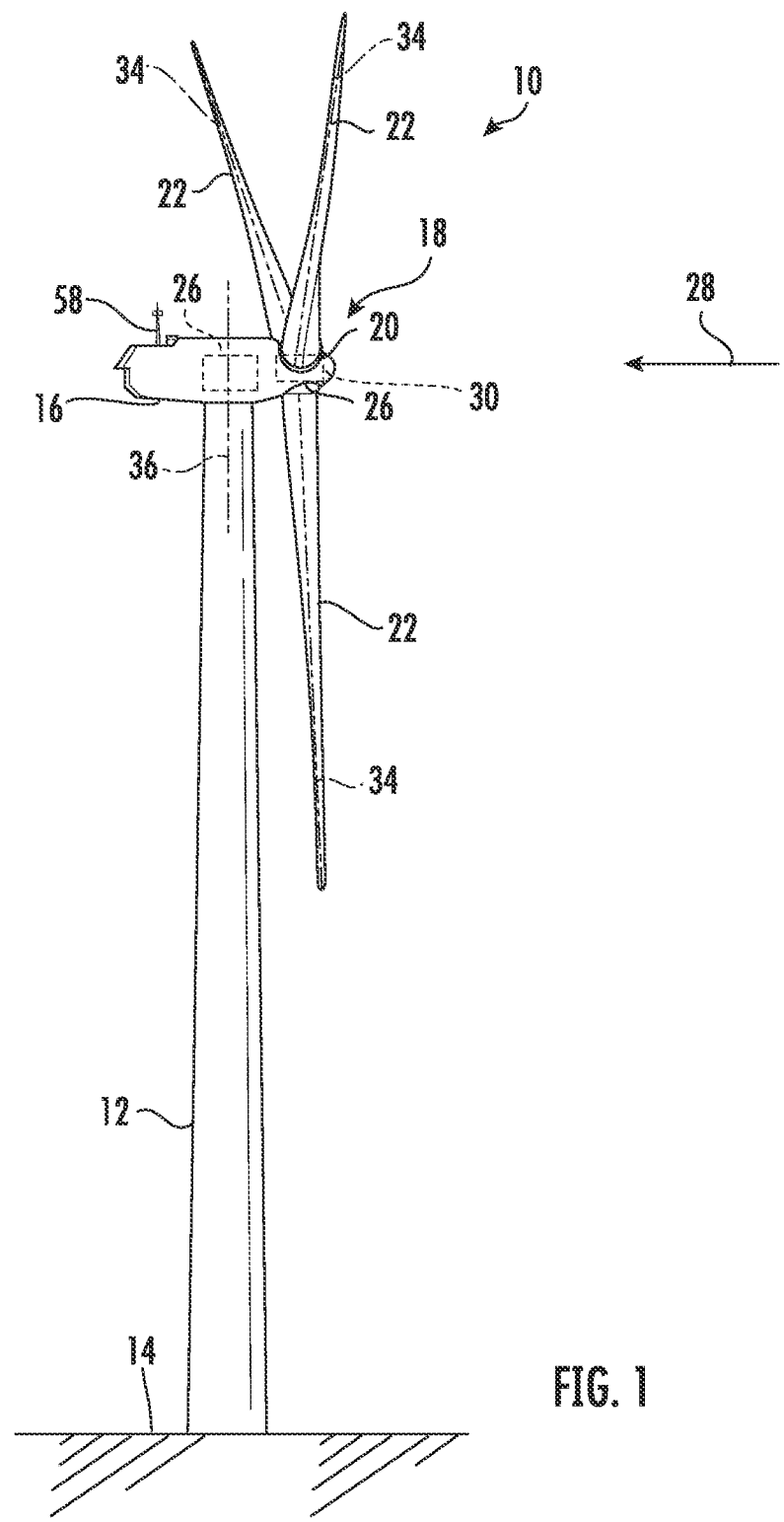
FIG. 1 illustrates a perspective view of an embodiment of a wind turbine according to the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for reducing wind turbine loads based on changing wind condition(s). In particular, when a wind turbine is operating, parked, or idling, wind condition(s) acting around portions of the wind turbine may change and result in an adverse condition for the wind turbine, such as wind turbine rotor imbalance. The wind turbine may thus take control action such as adjusting the nacelle via, for example, one or more yaw drive mechanisms, and/or adjusting the rotor blade(s) of the wind turbine via one or more pitch drive mechanisms to minimize such adverse loading.

In order to reduce wind turbine loads, it is common for conventional wind turbines to have various mechanisms and systems such as, for example, torque controllers, wind-direction tracking systems, and rotor imbalance control (RIC) systems, to name a few. For example, conventional wind turbines may have pitch controllers and torque controllers (along with a suite of internal component/system sensors and external/environmental sensors) that are configured to act when the wind turbine is experiencing below-rated wind speeds or above-rated wind speeds. These controllers are configured to act based on changing wind conditions and on the resulting change(s) in wind turbine dynamics. During below-rated wind speeds, the wind power output possible from the wind turbine may be lower than the rated power output of the wind turbine. Under these conditions, the pitch controller may act to maximize the power output by pitching the rotor blades substantially perpendicular to the wind direction. Alternatively, during above-rated wind speeds, the wind power output possible from the wind turbine may be greater than the rated power output of the wind turbine. Under these conditions, the pitch controller may restrain wind energy conversion by pitching the rotor blades such that only a part of the wind impinges on the rotor blades. In this way, by controlling the pitch angles of the rotor blade(s), the pitch controller can influence (along with the torque controller, for example) the rotor speed and therefore the wind turbine power output.

Along with influencing the rotor speed, the pitch controller may also be employed to reduce tower oscillations. Tower oscillations can occur due to numerous factors such as wind-condition induced rotor imbalance, ineffective structural damping, and rotor blade bending and/or twisting. Tower oscillations may manifest in a few forms. For example, a wind turbine tower may oscillate in a fore-aft direction, or tower nodding direction, in a side-to-side direction, or tower naying direction, or along the longitudinal axis, known as torsional oscillations.

Tower nodding, in particular, is often times a function of aerodynamic thrust resulting in rotor imbalance and wind turbine rotor speed. When the wind turbine rotor rotates, the thrust of the wind impinging on the rotor blades decreases. Such continuous variation in wind force on each individual rotor blade may result in continuous variations in the balance of moments or resulting loads on the rotor, thereby inducing oscillations in the wind turbine tower. Moreover, if the rotor speed is such that there are rotor blade(s) passing over the top of the wind turbine each time the wind turbine tower is at one of its extreme oscillation positions (forward or backward), then the tower oscillations may be amplified.

Although tower nodding may be minimized by incorporating various aerodynamic damping features (and associated damping and RIC controllers, for example) into the wind turbine, such features may rely on the presumption that the nacelle inherently oscillates in the fore-aft direction. Although this is not always true, and although changing environmental conditions may create short-term wind turbine dynamics that are incongruous with this presumption, the aerodynamic damping features and controllers nonetheless may operate as if the presumption is always true.

Therefore, in these situations, when the nacelle moves upwind, or forward, the rotor thrust is presumed to increase. This increase in the rotor thrust pushes the nacelle back downwind, and the expectation of a downwind push may be leveraged by the controller(s) to minimize the rotor imbalance and/or to dampen the tower oscillations. Similarly, when the nacelle of the wind turbine moves downwind, or backwards, the rotor thrust is presumed to decrease. This decrease in rotor thrust pushes the tower back upwind, and the expectation of an upwind push may be leveraged by the controller(s) to minimize the rotor imbalance and/or to dampen the tower oscillations.

As such, a conventional wind turbine may utilize two separate control loops for two separate functions, e.g., for RIC (rotor imbalance control) and for reducing tower oscillations. In particular, the RIC-loop may be employed to determine pitch angle(s) for the rotor blade(s) to influence the rotor speed, and the tower oscillation damping control loop may be used to compute pitch angle(s) to help reduce tower oscillations.

Often times, in conventional wind turbines, one control loop operates independently from the other control loop, and vice versa. For example, the RIC-loop determines the pitch angle(s) based on rotor speed, wind speed, rotor shaft bending signals, and the current pitch angle(s) of the rotor blade(s). The tower-damping control loop, on the other hand, determines the pitch angle(s) based on tower deflection signals, tower top velocity, tower top acceleration, wind speed, and the current pitch angle(s) of the rotor blade(s). Because of this relative independence, conventional wind turbines have RIC-loops that compute pitch angle(s) that may disadvantageously induce, instead of reduce, tower oscillations. Moreover, in the worst case, conventional RIC-loops inadvertently cause energy amplification in the rotor near tower resonance frequencies, with such amplification increasing oscillations in the wind turbine tower and the fatigue load placed thereon.

Over time, such fatigue loads due to conflicting or opposing control loops or due to conflicting or opposing controller presumptions (which as used herein include controller calculation coefficients, factors, weightings, and/or force multipliers, amongst others) reduce the useful life of conventional wind turbines. There is, therefore, a need for systems and methods for resolving these issues. Moreover, there is a need for systems and methods for better reducing wind turbine loads and, in particular, for reducing wind turbine loads based on changing wind condition(s) that result in unexpected, unusual, and/or short-term wind turbine dynamics.

Accordingly, in an embodiment, the present disclosure is directed to systems and methods for reducing wind turbine loads based on rotor imbalance. Rotor imbalance, like tower oscillations, is caused by numerous factors. For example, as described above, rotor imbalance may be a function of rotor speed, wind speed, rotor shaft bending signals, and the current pitch angle(s) of the rotor blade(s). Rotor thrust also plays a significant role in rotor imbalance as does gravity and wind shear.

In general, gravity pulls down on the nacelle and, therefore, on the rotor of a wind turbine, resulting in a downward, nose-down bending moment on the main rotor shaft. At the same time, wind shear acting on the nacelle and the rotor of the wind turbine usually results in force(s) that push the nacelle and the rotor in a direction opposite the downward pull of gravity. More specifically, wind shear conditions around the nacelle result in forces acting on the rotor blade(s) and rotor hub, with positive wind shear usually resulting in push forces transferred through the rotor blade(s) to the rotor hub and to the rotor shaft connected thereto. The most common positive wind shear conditions (e.g., when the wind speed going over the top of the nacelle and past the rotor is greater than the wind speed below the nacelle and past the rotor), therefore, apply an asymmetric load across the rotor that results in a nose-up bending moment. Such upward bending moment opposes the downward gravitational moment. Under certain operating conditions, the force(s) acting on the nacelle and the rotor resulting from the positive wind shear may equal the gravitational force acting on the nacelle and/or the rotor.

In this way, in an embodiment, systems and methods of the present disclosure include compensating for the positive wind shear by, for example, presuming that the resulting rotor shaft bending moment is upward and opposes the force of gravity. However, the wind shear conditions around the nacelle do not always result in positive wind shear and thus the resulting wind shear (positive or negative) cannot always be leveraged as expected. Low wind speeds, for example, as well as significant air temperature inversions and air density gradients, may produce low-positive to high-negative wind shear (e.g., when the wind speed going over the top of the nacelle and past the rotor is less than the wind speed below the nacelle and past the rotor). It is possible that low positive to high negative wind shear may coincide with the presence of low-level jet-streams (LLJSs) (e.g., currents of air, or wind maxima, in the lowest 2.0 kilometers of the Earth's atmosphere wherein the turbulence flux zone generally passes along or below the bottom of the nacelle). These "negative wind shear conditions", therefore, may apply an asymmetric load across the rotor that, instead of opposing the force of gravity, contribute to the nose-down bending moment on the rotor shaft. Moreover, LLJSs only exacerbate the situation as the associated low wind speed(s) result in the wind turbine control systems not being able to produce sufficient increased thrust from, for example, conventional blade-pitch adjustment control actions to compensate for the increased downward bending moment. This is especially true if the conventional control action is designed to maximize or sustain wind turbine power output.

As such, in an embodiment according to the present disclosure, when under low positive to high negative wind shear conditions, systems and methods of the present disclosure may compensate for the force(s) acting on the nacelle and the rotor by, for example, ignoring the effect(s) of the wind shear (positive or negative), and/or by no longer presuming that the shaft bending moment is downward. In another embodiment, a RIC controller may include an operation mode for low positive to high negative wind shear conditions. This operating mode may be triggered by the detection of a high negative bending moment signal or by an shear-induced load calculation or estimate, for example.

Under these conditions, the RIC controller may be operating in the lower rotor speed range, and the operation mode may function to increase the rotor speed from a power optimized rotor speed setpoint towards a load optimized rotor speed setpoint to better manage the imbalance in the rotor. The increase in rotor speed may result, for example, in an increased thrust condition that can be utilized by the RIC controller to better address the rotor imbalance. Thus, in an embodiment, a system and method of the present disclosure includes determining a loading condition(s) of the wind turbine, determining a wind condition at the wind turbine, determine a rotor speed setpoint of the wind turbine to cause an increase in thrust when the loading condition(s) exceed a loading threshold and the wind condition is below a wind threshold, and operating a rotor imbalance control module of the wind turbine based on the rotor speed setpoint. As used herein, a wind condition may generally include any of wind speed, wind gust, wind direction, wind acceleration, wind turbulence, wind shear, wind veer, wake, or the like.

In another embodiment, a system and method of the present disclosure includes determining one or more wind conditions at the wind turbine. In an embodiment, the system and method of the present disclosure may measure the wind condition(s), for example, using one or more sensors. Alternatively, in an embodiment, the system and method of the present disclosure may also include receiving an operating parameter(s) of the wind turbine and determining the wind condition at the wind turbine based on the operating parameter(s). In such embodiments, as used herein, an operating parameter of the wind turbine includes any of rotor position, thrust, loads, power, speed, torque, blade weight, gravity, pitch angle, nodding moment, overhang moment, bearing lubrication schedule, a rotor azimuth angle, a yawing moment, or equivalent. The system and method of the present disclosure may also include determining whether the rotor of the wind turbine is imbalanced beyond a predetermined threshold. Moreover, the system and method of the present disclosure may include determining whether the wind condition(s) at the nacelle are indicative of negative wind shear conditions at the nacelle. As such, the system and method of the present disclosure may further include implementing a control action when the rotor is imbalanced beyond the predetermined threshold and when the negative wind shear conditions are at the nacelle.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
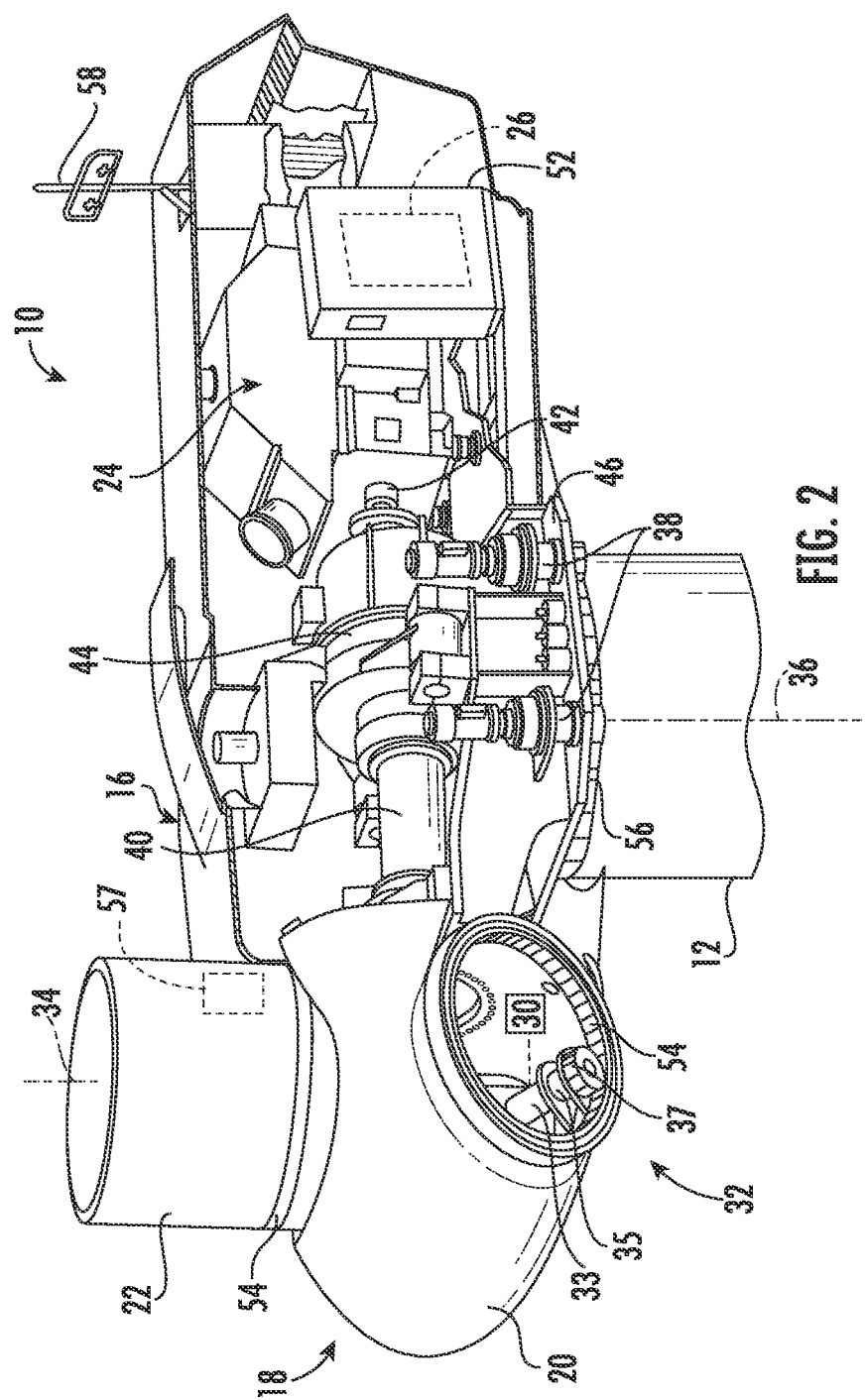
FIG. 2 illustrates a simplified, internal view of an embodiment of a nacelle of a wind turbine according to the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks mounted to the bedplate 46.

As shown in FIGS. 1 and 2, the wind turbine 10 may also include a turbine control system or a controller 26 within the nacelle 16. For example, as shown in FIG. 2, the controller 26 is disposed within a control cabinet 52 mounted to a portion of the nacelle 16. However, it should be appreciated that the controller 26 may be disposed at any location on or in the wind turbine 10, at any location on the support surface 14 or generally at any other location. Further, the controller 26 may be communicatively coupled to any number of the components of the wind turbine 10 in order to control the operation of such components and/or to implement a control action. Accordingly, the controller 26 may generally be configured to control the various operating modes (e.g., start-up or shut-down sequences, RIC control system), de-rate the wind turbine 10, and/or control various components of the wind turbine 10 as will be discussed in more detail below.

In addition, as shown in FIG. 2, the wind turbine 10 may also include one or more sensors 57, 58 as described in more detail herein. For example, in various embodiments, the sensors may include blade sensors 57 for measuring a pitch angle of one of the rotor blades 22, for measuring a load acting on one of the rotor blades 22, for measuring a distance from the tower, or for measuring other operating parameters associated with the rotor blades 22; generator sensors (not shown) for monitoring the generator 24 (e.g. torque, rotational speed, acceleration and/or the power output) or for monitoring the operating parameters associated with the generator; sensors for measuring the imbalance loading in the rotor 18 (e.g. main shaft bending sensors; not shown) or for monitoring the operating parameters associated with the main shaft of the rotor 18; and/or various wind sensors 58 for directly or indirectly measuring various wind conditions, such as wind speed, wind peaks, wind turbulence, wind shear, changes in wind direction, air density, or similar. Further, the sensors may be located near the ground of the wind turbine 10, on the tower, on the nacelle 16, on the rotor 18, or on a meteorological mast of the wind turbine (not shown). It should also be understood that any other number or type of sensors may be employed and at any location. For example, the sensors may be Micro Inertial Measurement Units (MIMUs), strain gauges, accelerometers, pressure sensors, angle of attack sensors, vibration sensors, proximity sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicate that the various sensors may be configured to provide a direct measurement of the wind conditions, for example, being monitored or an indirect measurement of the operating parameters of the wind turbine 10. Thus, the sensors may, for example, be used to generate signals relating to the wind conditions and/or the operating parameter being monitored, which can then be utilized by the controller 26 to determine the actual parameter.

As used herein, an operating parameter of the wind turbine includes any of rotor position, thrust, loads, power, speed, torque, blade weight, gravity, pitch angle, nodding moment, overhang loading, a rotor azimuth angle, a yawing moment, or equivalent. Thus, the sensors described herein may, for example, be used to generate a signal(s) relating to the operating parameter, which can then be utilized by the controller 26 to determine the wind condition(s), for example. Moreover, the sensors may further be in communication with the controller 26 and may provide related information to the controller 26. For example, in an embodiment, the controller 26 may be configured to determine a loading condition(s) of the wind turbine 10 resulting from a negative wind shear conditions. The controller 26 also may be configured to determine a wind condition at the wind turbine 10. Moreover, the controller 26 may be configured to determine a rotor speed setpoint of the wind turbine 10 to cause an increase in thrust when the loading condition(s) resulting from the negative wind shear conditions exceeds a loading threshold and when the wind condition is below a wind threshold. Further, the controller 26 may be configured to operate based on the rotor speed setpoint.

In another embodiment according to the present disclosure, the controller 26 is configured to determine a wind condition(s) at the nacelle 16 of the wind turbine 10. The controller 26 also may be configured to determine whether the rotor 18 of the wind turbine 10 is imbalanced beyond a predetermined threshold. Moreover, the controller 26 may be configured to determine whether the wind condition(s) at the nacelle 16 are indicative of negative wind shear conditions at the nacelle 16. Further, the controller 26 may be configured to implement a control action when the rotor 18 is imbalanced beyond the predetermined threshold and when the negative wind shear conditions are at the nacelle 16.

Further, the controller 26 may also be communicatively coupled to various components of the wind turbine 10 for generally controlling the wind turbine 10 and/or such components. For example, each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34.

As such, the controller 26 may be communicatively coupled to each pitch adjustment mechanism 32 of the wind turbine 10 (one of which is shown) through a pitch controller 30 for controlling and/or altering the pitch angle of the rotor blades 22 (i.e., an angle that determines a perspective of the rotor blades 22 with respect to the direction 28 of the wind). For instance, the controller 26 and/or the pitch controller 30 may be configured to transmit a control signal/command to each pitch adjustment mechanism 32 such that the pitch adjustment mechanism(s) 32 adjusts the pitch angle of the rotor blades 22 as described herein. The controller 26 may control the pitch angle of the rotor blades 22, either individually or simultaneously, by transmitting suitable control signals/commands to a pitch controller 30 of the wind turbine 10, which may be configured to control the operation of multiple pitch drives or pitch adjustment mechanisms 32 of the wind turbine, or by directly controlling the operation of multiple pitch drives or pitch adjustment mechanisms. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10).

More specifically, yawing of the wind turbine 10 may occur due to sensing of changes in the wind directions(s) 28 or wind speed. For example, the controller 26 may be communicatively coupled to the yaw drive mechanism(s) 38 of the wind turbine 10 for controlling and/or altering the yaw direction of the nacelle 16 relative to the direction 28 (FIG. 1) of the wind. Further, as the wind speed changes, the controller 26 may be configured to control a yaw angle of the nacelle 16 about a yaw axis 36 to position the rotor blades 22 with respect to the direction 28 of the wind, thereby controlling the loads acting on the wind turbine 10. For example, the controller 26 may be configured to transmit control signals/commands to a yaw drive mechanism 38 (FIG. 2) of the wind turbine 10, via a yaw controller or direct transmission, such that the nacelle 16 may be rotated about the yaw axis 36 via a yaw bearing 56.

Figure 3:
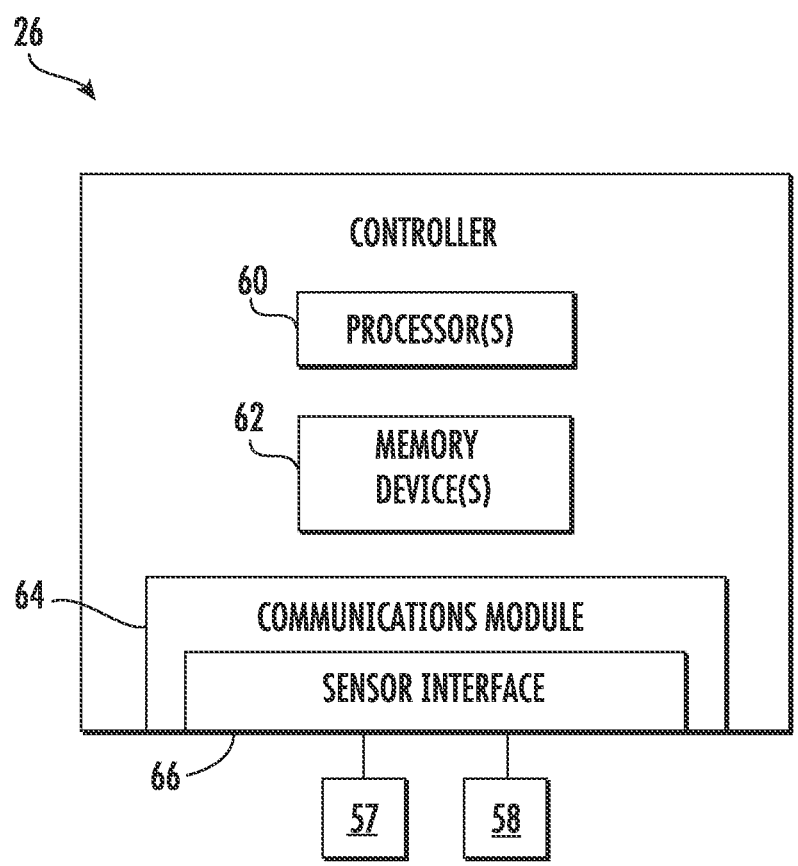
FIG. 3 illustrates a schematic diagram of an embodiment of a controller of a wind turbine according to the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from the sensors 57, 58 to be converted into signals that can be understood and processed by the processors 60. It should be appreciated that the sensors 57, 58 may be communicatively coupled to the communications module 64 using any suitable means. For example, as shown in FIG. 3, the sensors 57, 58 are coupled to the sensor interface 66 via a wired connection. However, in other embodiments, the sensors 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement control action(s) in response to, for example, a loading measure exceeding a predetermined threshold as described herein, as well as various other suitable computer-implemented functions.

It should be further understood that the control action(s) as described herein may encompass any suitable command or constraint by the controller 26. For example, in several embodiments, the control action may include temporarily de-rating or up-rating the wind turbine 10 to prevent excessive loads on one or more of the wind turbine components. Up-rating the wind turbine 10, such as by up-rating torque, may temporarily slow down the wind turbine 10 and function as a brake to reduce or prevent loading. De-rating the wind turbine 10 may include speed de-rating, torque de-rating or a combination of both. Further, as mentioned, the wind turbine 10 may be de-rated by pitching one of the rotor blades 22 about its pitch axis 34. More specifically, the controller 26 may generally control each pitch adjustment mechanism 32 in order to alter the pitch angle of each rotor blade 22 between 0 degrees (i.e., a power position of the rotor blade 22) and 90 degrees (i.e., a feathered position of the rotor blade 22).

Moreover, as is generally understood, especially under low wind speed conditions, there is a limit to the amount of additional thrust that the controller 26 can leverage from a control action(s) to overcome, for example, rotor imbalance. When the controller 26 is operating at its limits, the controller 26 may not be able to respond with additional control action(s) to steady-state or dynamic (e.g., relatively fast) changes in wind shear. For example, control actions from the controller 26 that call for further individual pitch offsets may not be able to produce sufficient thrust, and the increased offsets may lead to increased and/or accelerated pitch bearing (see FIG. 2; 54) wear. As such, the controller 26 is configured to control the wind turbine 10 and/or to adjust the current control action(s), as described herein, to reduce fatigue and other dynamic stresses on the wind turbine 10 and, in particular, on the rotor 18. In particular, in an embodiment, under negative wind shear conditions as used herein, the controller 26 is configured to increase the rotor speed from a power optimized rotor speed setpoint towards a load optimized rotor speed setpoint. Such an increase in rotor speed results in increased thrust that can be leveraged by the controller 26 to operate more effectively during certain wind conditions, such as LLJSs or negative shear conditions.

Figure 4A:
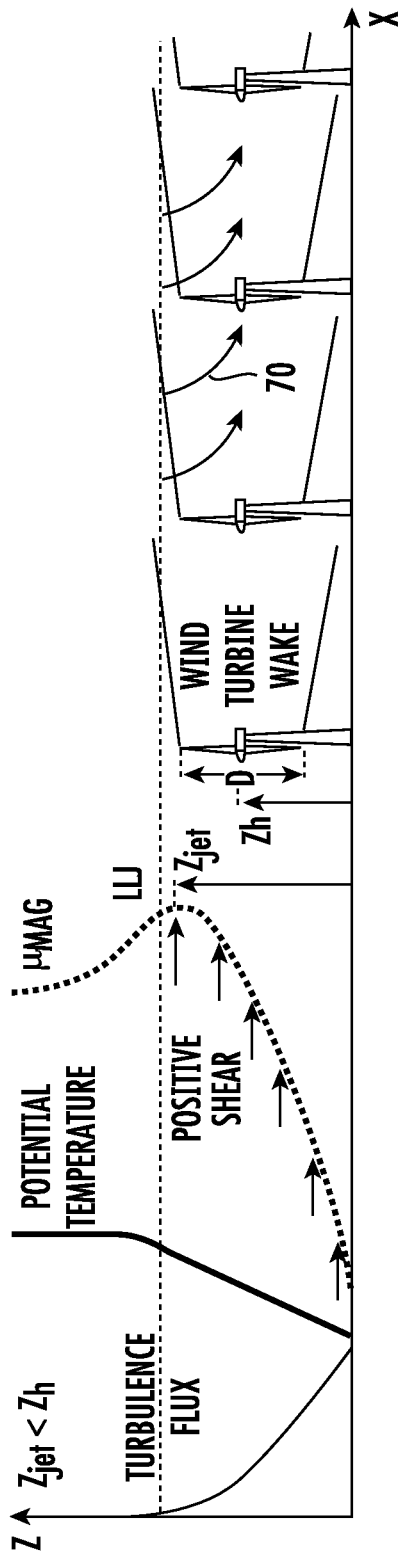
FIG. 4A illustrates a plurality of wind turbines under low positive wind shear conditions and low-level jet-streams according to the present disclosure.
Figure 4B:
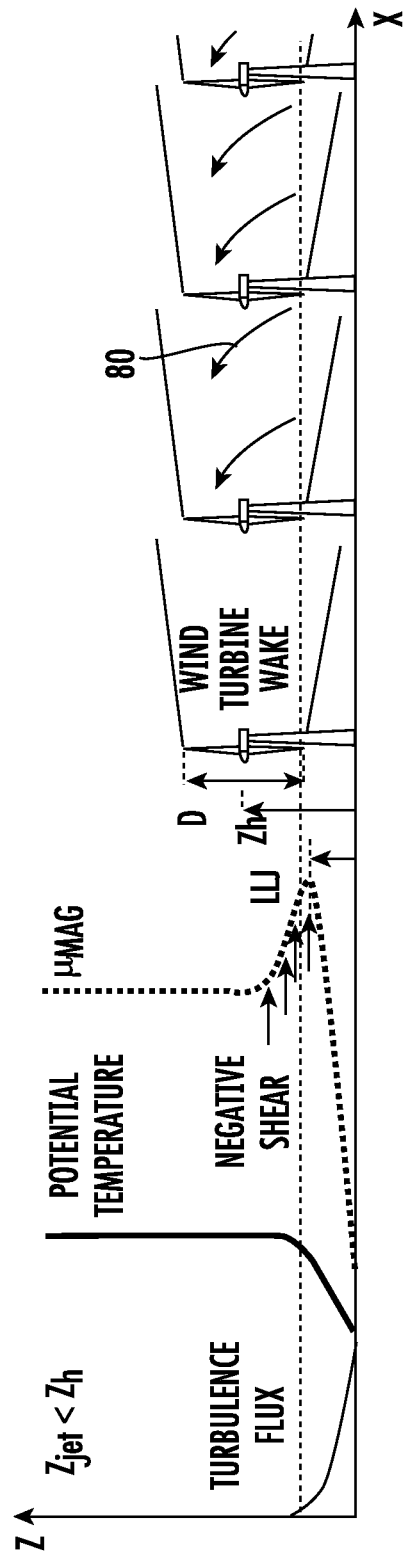
FIG. 4B illustrates a plurality of wind turbines under negative wind shear conditions and low-level jet-streams according to the present disclosure.

Referring now to FIGS. 4A and 4B, there is illustrated a plurality of wind turbines 10 under wind shear conditions according to the present disclosure. More specifically, FIG. 4A illustrates a plurality of wind turbines 10 under low positive wind shear conditions and LLJs according to the present disclosure, and FIG. 4B illustrates a plurality of wind turbines 10 under negative wind shear conditions and LLJs according to the present disclosure. In particular, FIG. 4A illustrates the wind turbines 10 operating in low-positive wind shear conditions, while the LLJs are substantially above the turbine rotor swept area ($Z_{jet}>Z_h$) (as represented by downward arrows 70 being below dotted line LLJ). Further, FIG. 4B illustrates the wind turbines 10 operating in negative wind shear conditions, while the LLJs are substantially below the turbine rotor swept area ($Z_{jet}<Z_h$) (as represented by upward arrows 80 being below dotted line LLJ). As briefly mentioned herein, low wind speeds as well as significant air temperature inversions and air density gradients, may produce low-positive to high-negative wind shear, and it is possible that low positive to high negative wind shear may coincide with the presence of LLJs or currents of air in the lowest 2.0 kilometers of the Earth's atmosphere wherein the turbulence flux zone generally passes along or below the bottom of the nacelle 16. These "negative wind shear conditions", therefore, apply an asymmetric load that, instead of opposing the force of gravity, contribute to the nose-down bending moment on the rotor shaft.

Figure 5:
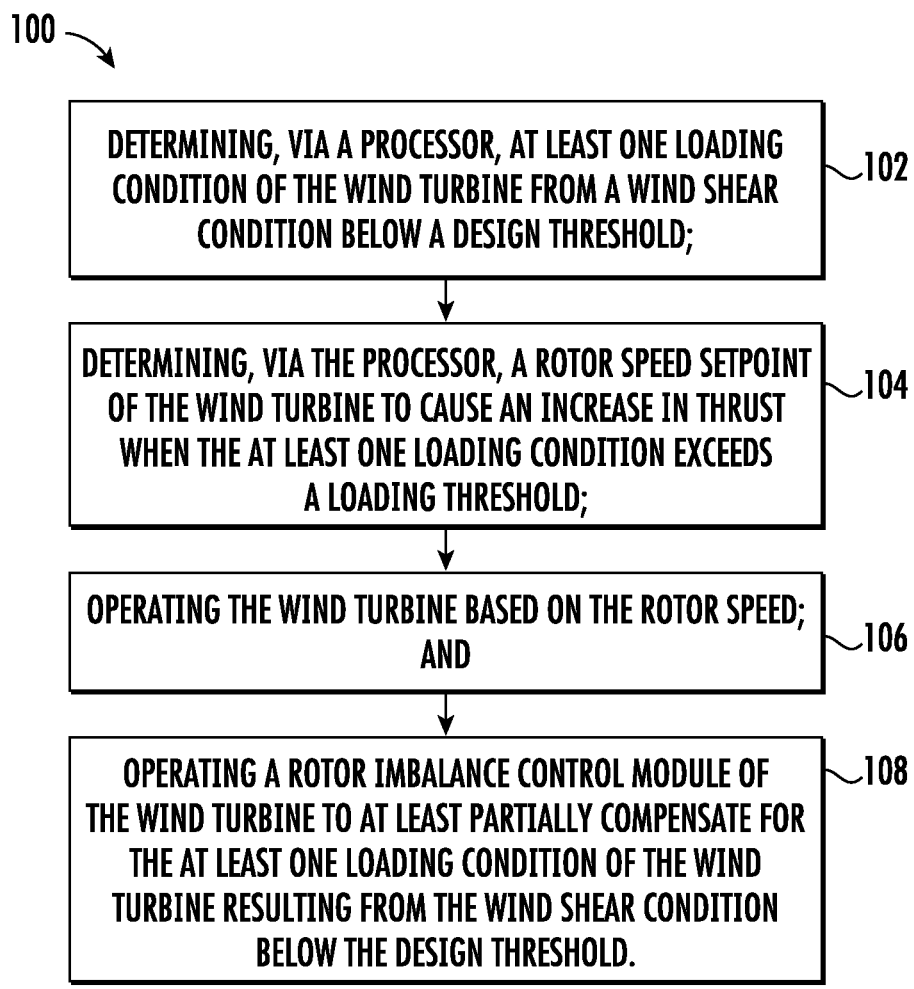
FIG. 5 illustrates a flow diagram of an embodiment of a method for reducing loads acting on a wind turbine during negative wind shear conditions according to the present disclosure.

Referring now to FIG. 5, a flow diagram of a method 100 for reducing loads acting on a wind turbine during negative wind shear conditions is illustrated according to the present disclosure. The method 100 is described herein as implemented using, for example, the wind turbine 10 described above. However, it should be appreciated that the disclosed method 100 may be implemented using any other suitable wind turbine now known or later developed in the art. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes determining a loading condition(s) of the wind turbine resulting from a negative wind shear condition. In an embodiment, for example, the method 100 may include determining the loading condition resulting from the negative wind shear conditions by receiving sensor signals from the sensors of the wind turbine. The method 100 further includes determining the loading condition resulting from the negative wind shear conditions as a function of the sensor signals. In an embodiment, the loading condition may include, for example, a negative bending moment or a shear-induced load.

Optionally, the method may also include determining one or more wind conditions. In an embodiment, for example, the method 100 may include determining the wind condition by receiving one or more sensor signals from the sensors of the wind turbine. The method 100 may further include determining the wind condition as a function of the sensor signals. In an embodiment, the wind condition may be, for example, wind speed, wind gust, wind direction, wind acceleration, wind turbulence, wind shear, wind veer, or wake.

As shown as (104), the method 100 includes determining a rotor speed setpoint of the wind turbine to cause an increase in thrust when the at least one loading condition exceeds a loading threshold. In an embodiment, for example, the method 100 may include increasing a rotor speed from a power optimized rotor speed setpoint towards a load optimized rotor speed setpoint to cause the increase in thrust. Thus, as shown as (106), the method 100 includes operating the wind turbine based on the rotor speed. Further, as shown at (108), the method 100 includes operating a rotor imbalance control module of the wind turbine to at least partially compensate for the at least one loading condition of the wind turbine resulting from the wind shear condition below the design threshold.

Figure 6:
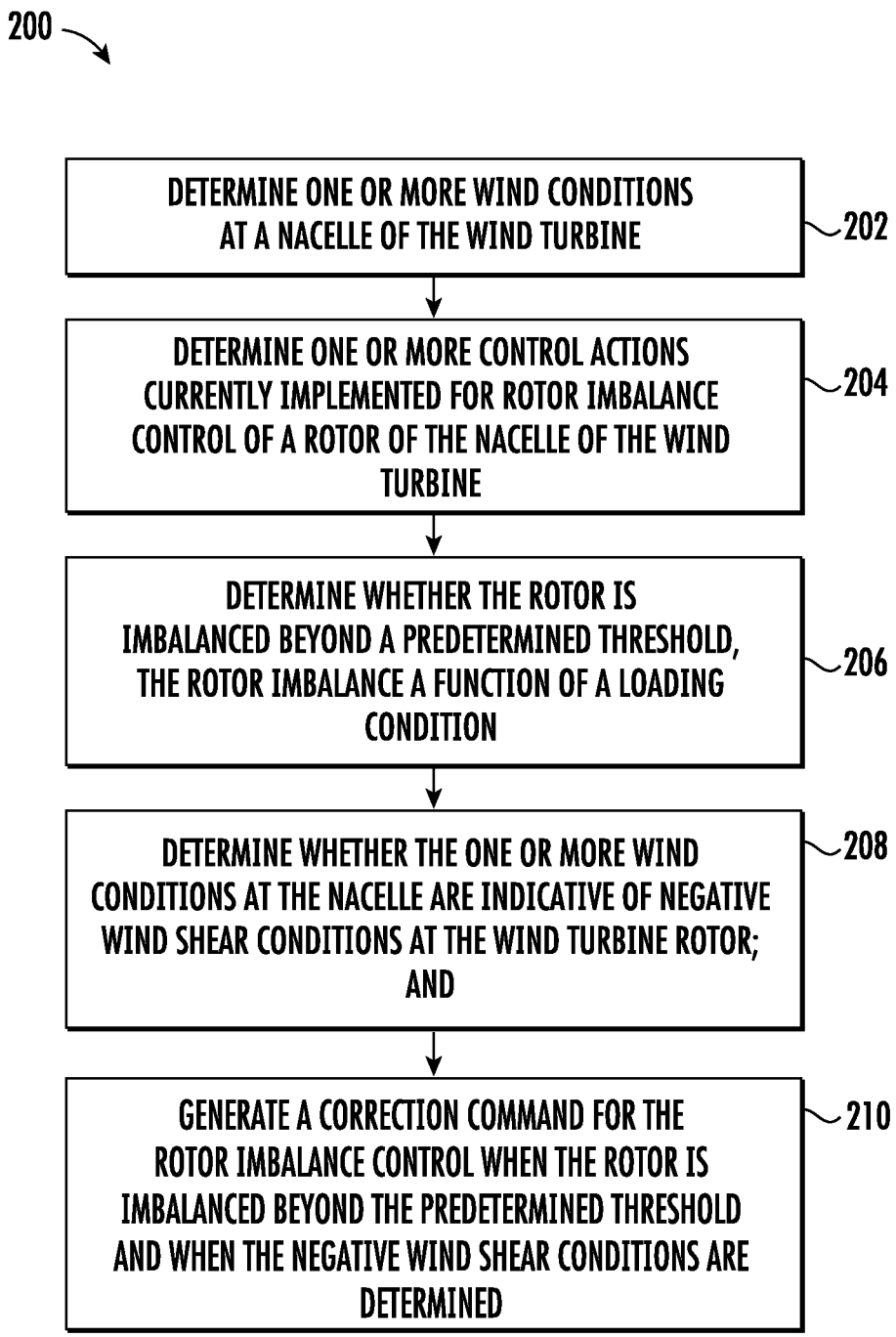
FIG. 6 illustrates a flow diagram of an embodiment of a method for adaptive rotor imbalance control in a wind turbine according to the present disclosure.

Referring now to FIG. 6, a flow diagram of an embodiment of a method 200 for adaptive rotor imbalance control in a wind turbine is illustrated according to the present disclosure. The method 200 is described herein as implemented using, for example, the wind turbine 10 described above. However, it should be appreciated that the disclosed method 200 may be implemented using any other suitable wind turbine now known or later developed in the art. In addition, although FIG. 6 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes determining a wind condition(s) at a nacelle of the wind turbine. More specifically, in an embodiment, the method 200 may include determining the wind condition(s) by receiving an operating parameter(s) of the wind turbine and determining the wind condition(s) at the wind turbine based on the operating parameter(s). In an embodiment, for example, the operating parameter(s) of the wind turbine may include rotor position, thrust, loads, power, speed, torque, blade weight, gravity, pitch angle, nodding moment, overhang moment, bearing lubrication schedule, a rotor azimuth angle, and/or a yawing moment. In another embodiment, the method 200 may include determining the operating parameter(s) by receiving sensor signals from the sensors of the wind turbine. Thus, in an embodiment, the method 200 is configured to determine the operating parameter(s) as a function of the sensor signals.

As shown as (204), the method 200 includes determining a control action(s) currently implemented for rotor imbalance control of a rotor of the wind turbine. In an embodiment, for example, the method 200 may include determining RIC-loop(s) currently implemented for RIC of the rotor of the wind turbine. In an embodiment, the method 200 may include determining if the rotor blades are pitched to power when positioned above the nacelle and pitched to feather when positioned below the nacelle.

As shown as (206), the method 200 includes determining whether the rotor is imbalanced beyond a predetermined threshold. In an embodiment, the method 200 may include determining a bending moment on a main shaft of the rotor due to the negative wind shear conditions at the rotor.

As shown as (208), the method 200 includes determining whether the wind condition(s) at the nacelle are indicative of the negative wind shear conditions at the rotor. In an embodiment, the wind condition(s) at a plurality of locations along a vertical direction of the nacelle of the wind turbine may be indicative of negative wind shear conditions at the rotor, nacelle, and/or wind turbine. In another embodiment, the wind speed at the plurality of locations along the vertical direction of the nacelle of the wind turbine may be indicative of negative wind shear conditions at the rotor, nacelle, and/or wind turbine. In another embodiment, the wind speed above the nacelle being lesser than the wind speed below the nacelle may be indicative of negative wind shear conditions at the rotor, nacelle, and/or wind turbine. In another embodiment, the operating parameters determined from sensor signals received at the plurality of locations along the vertical direction of the nacelle of the wind turbine may be indicative of negative wind shear conditions at the rotor, nacelle, and/or wind turbine.

As shown as (210), the method 200 includes generating a correction command for the RIC when the rotor is imbalanced beyond the predetermined threshold and when the negative wind shear conditions are at the rotor. In an embodiment, the method 200 may include increasing the rotor speed from a power optimized rotor speed setpoint towards a load optimized rotor speed setpoint.

Further aspects of the present disclosure are provided by the subject matter of the following clauses:

A method for reducing loads acting on a wind turbine, the method comprising: determining, via a processor, at least one loading condition of the wind turbine resulting from a wind shear condition below a design threshold; determining, via the processor, a rotor speed setpoint of the wind turbine to cause an increase in thrust when the at least one loading condition exceeds a loading threshold; operating the wind turbine based on the rotor speed; and operating a rotor imbalance control module of the wind turbine to at least partially compensate for the at least one loading condition of the wind turbine resulting from the wind shear condition below the design threshold.

The method of any preceding clause, wherein the at least one loading condition of the wind turbine comprises at least one of the following: a negative bending moment or a shear-induced load.

The method of any preceding clause, further comprising: determining, via the processor, a wind condition at the wind turbine; and determining, via the processor, the rotor speed setpoint of the wind turbine to cause the increase in thrust when the wind condition is below a wind condition threshold.

The method of any preceding clause, wherein the wind condition at the wind turbine is at least one of the following: wind speed, wind gust, wind direction, wind acceleration, wind turbulence, wind shear, wind veer, or wake.

The method of any preceding clause, wherein operating the rotor imbalance control module of the wind turbine comprises: increasing, via the controller, a rotor speed from a power optimized rotor speed setpoint towards a load optimized rotor speed setpoint to cause the increase in thrust.

The method of any preceding clause, further comprising implementing, via the controller, a control action when the at least one loading condition exceeds the loading threshold.

The method of any preceding clause, wherein implementing the control action comprises pitching one or more rotor blades of the wind turbine.

The method of any preceding clause, wherein implementing the control action comprises yawing a nacelle of the wind turbine.

The method of any preceding clause, further comprising monitoring, via one or more sensors, at least one operating parameter at a plurality of locations along a vertical direction of the nacelle of the wind turbine.

The method of any preceding clause, wherein determining the wind condition at the wind turbine further comprises: receiving the at least one operating parameter from the plurality of locations along the vertical direction of the nacelle of the wind turbine; and determining the wind condition at the wind turbine based on the at least one operating parameter received from the plurality of locations.

The method of any preceding clause, wherein the plurality of locations along the vertical direction of the nacelle comprises at least one location above the nacelle and at least one location below the nacelle.

A system for rotor imbalance control in a wind turbine, the wind turbine having a nacelle mounted atop a tower and a rotor mounted to the nacelle, the rotor having a rotatable hub with a plurality of rotor blades mounted thereto, the system comprising: a controller comprising at least one processor configured to perform a plurality of operations, the plurality of operations comprising: determining at least one loading condition of the wind turbine resulting from a wind shear condition below a design threshold; determining whether the rotor of the wind turbine is imbalanced beyond a predetermined threshold as a function of the at least one loading condition; and implementing a control action when the rotor is imbalanced beyond the predetermined threshold.

The system of any preceding clause, further comprising: determining one or more wind conditions at the wind turbine; and determining the rotor speed setpoint of the wind turbine to cause the increase in thrust when the one or more wind condition is below a wind condition threshold, wherein the one or more wind conditions at the wind turbine comprises at least one of wind speed, wind gust, wind direction, wind acceleration, wind turbulence, wind shear, wind veer, or wake.

The system of any preceding clause, further comprising one or more sensors communicatively coupled to the controller, the one or more sensors configured to generate sensor signals representative of at least one operating parameter, wherein determining the one or more wind conditions at the wind turbine comprises: receiving the at least one operating parameter of the wind turbine from a plurality of locations along a vertical direction of the nacelle of the wind turbine; and determining the one or more wind conditions at the wind turbine based on the at least one operating parameter received from the plurality of locations.

The system of any preceding clause, further comprising: determining whether the one or more wind conditions at the wind turbine are indicative of a wind shear condition below a design threshold by: estimating, based on the at least one operating parameter, a wind speed at the plurality of locations along the vertical direction of the nacelle of the wind turbine; comparing the wind speed at the plurality of locations along the vertical direction of the nacelle of the wind turbine; and determining that the wind speed at a higher location is less than the wind speed at a lower location.

The method of any preceding clause, wherein determining whether the rotor of the wind turbine is imbalanced beyond the predetermined threshold comprises: determining, based on the at least one operating parameter, a bending moment on a main shaft of the rotor due to the negative wind shear conditions at the rotor.

The method of any preceding clause, wherein determining whether the rotor of the wind turbine is imbalanced beyond the predetermined threshold further comprises: determining, via the processor, a load of the rotor as a function of the bending moment on the main shaft of the rotor.

A method for adaptive rotor imbalance control in a wind turbine, the method comprising: determining, via a processor, one or more wind conditions at the wind turbine; determining, via the processor, one or more control actions currently implemented for rotor imbalance control of a rotor of the wind turbine; determining, via the processor, whether the rotor is imbalanced beyond a predetermined threshold as a function of a loading condition; determining, via the processor, whether the one or more wind conditions at the nacelle are indicative of negative wind shear conditions at the wind turbine; and generating, via the processor, a correction command for the rotor imbalance control when the rotor is imbalanced beyond the predetermined threshold and when the negative wind shear conditions are determined.

The method of any preceding clause, wherein determining the one or more wind conditions at the wind turbine comprises: receiving, via the processor, at least one operating parameter of the wind turbine; and determining the wind condition at the wind turbine based on the at least one operating parameter.

The method of any preceding clause, wherein determining whether the rotor of the wind turbine is imbalanced beyond the predetermined threshold comprises: determining a bending moment on a main shaft of the rotor due to the negative wind shear conditions at the wind turbine.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for adaptive rotor imbalance control in a wind turbine, the method comprising:
   determining, via a processor, one or more wind conditions at the wind turbine;
   determining, via the processor, one or more control actions currently implemented for rotor imbalance control of a rotor of the wind turbine;
   determining, via the processor, at least one loading condition of the wind turbine resulting from a wind shear condition below a design threshold;
   determining, via the processor, whether the rotor is imbalanced beyond a predetermined threshold as a function of the at least one loading condition;
   determining, via the processor, whether the one or more wind conditions at a nacelle of the wind turbine are indicative of negative wind shear conditions at the wind turbine; and
   generating, via the processor, a correction command for the rotor imbalance control when the rotor is imbalanced beyond the predetermined threshold and when the one or more wind conditions at the nacelle of the wind turbine are indicative of the negative wind shear conditions; and
   operating, via the processor, the wind turbine based on the correction command to at least partially compensate for the at least one loading condition.

2. The method of claim 1, wherein the at least one loading condition of the wind turbine comprises at least one of the following: a negative bending moment or a shear-induced load.

3. The method of claim 1, wherein determining the one or more wind conditions at the wind turbine comprises:
   receiving, via the processor, at least one operating parameter of the wind turbine; and
   determining the one or more wind conditions at the wind turbine based on the at least one operating parameter.

4. The method of claim 3, wherein the one or more wind conditions condition at the wind turbine is at least one of the following: wind speed, wind gust, wind direction, wind acceleration, wind turbulence, wind shear, wind veer, or wake.

5. The method of claim 1, wherein operating the wind turbine based on the correction command further comprises:
   increasing, via the processor, a rotor speed from a power optimized rotor speed setpoint towards a load optimized rotor speed setpoint to cause the increase in thrust.

6. The method of claim 1, further comprising implementing, via the processor, a control action when the at least one loading condition exceeds a loading threshold.

7. The method of claim 6, wherein implementing the control action comprises pitching one or more rotor blades of the wind turbine.

8. The method of claim 6, wherein implementing the control action comprises yawing the nacelle of the wind turbine.

9. The method of claim 1, further comprising monitoring, via one or more sensors, at least one operating parameter at a plurality of locations along a vertical direction of the nacelle of the wind turbine.

10. The method of claim 9, wherein determining the one or more wind conditions at the wind turbine further comprises:
    receiving the at least one operating parameter from the plurality of locations along the vertical direction of the nacelle of the wind turbine; and
    determining the one or more wind conditions at the wind turbine based on the at least one operating parameter received from the plurality of locations.

11. The method of claim 9, wherein the plurality of locations along the vertical direction of the nacelle comprises at least one location above the nacelle and at least one location below the nacelle.

12. A system for adaptive rotor imbalance control in a wind turbine, the wind turbine having a nacelle mounted atop a tower and a rotor mounted to the nacelle, the rotor having a rotatable hub with a plurality of rotor blades mounted thereto, the system comprising:
    a controller comprising at least one processor configured to perform a plurality of operations, the plurality of operations comprising:
       determining one or more wind conditions at the wind turbine;
       determining one or more control actions currently implemented for rotor imbalance control of the rotor of the wind turbine;
       determining at least one loading condition of the wind turbine resulting from a wind shear condition below a design threshold;
       determining whether the rotor is imbalanced beyond a predetermined threshold as a function of the at least one loading condition;
       determining whether the one or more wind conditions at the nacelle of the wind turbine are indicative of negative wind shear conditions at the wind turbine; and
       generating a correction command for the rotor imbalance control when the rotor is imbalanced beyond the predetermined threshold and when the one or more wind conditions at the nacelle of the wind turbine are indicative of the negative wind shear conditions; and operating the wind turbine based on the correction command to at least partially compensate for the at least one loading condition.

13. The system of claim 12, wherein determining the one or more wind conditions at the wind turbine comprises:

receiving at least one operating parameter of the wind turbine; and determining the one or more wind conditions at the wind turbine based on the at least one operating parameter, wherein the one or more wind conditions at the wind turbine comprises at least one of wind speed, wind gust, wind direction, wind acceleration, wind turbulence, wind shear, wind veer, or wake.

14. The system of claim 13, further comprising one or more sensors communicatively coupled to the controller, the one or more sensors configured to generate sensor signals representative of the at least one operating parameter, wherein determining the one or more wind conditions at the wind turbine comprises:

receiving the at least one operating parameter of the wind turbine from a plurality of locations along a vertical direction of the nacelle of the wind turbine; and determining the one or more wind conditions at the wind turbine based on the at least one operating parameter received from the plurality of locations.

15. The system of claim 14, wherein determining whether the one or more wind conditions at the nacelle of the wind turbine are indicative of negative wind shear conditions at the wind turbine further comprises:

estimating, based on the at least one operating parameter, a wind speed at the plurality of locations along the vertical direction of the nacelle of the wind turbine;

comparing the wind speed at the plurality of locations along the vertical direction of the nacelle of the wind turbine; and determining that the wind speed at a higher location is less than the wind speed at a lower location.

16. The system of claim 14, further comprising determining, based on the at least one operating parameter, a bending moment on a main shaft of the rotor due to the negative wind shear conditions at the rotor.

17. The system of claim 16, wherein determining whether the rotor of the wind turbine is imbalanced beyond the predetermined threshold further comprises:

determining, via the at least one processor, a load of the rotor as a function of the bending moment on the main shaft of the rotor.

* * * * *